(12) United States Patent
Bestgen et al.

(10) Patent No.: US 8,396,852 B2
(45) Date of Patent: *Mar. 12, 2013

(54) EVALUATING EXECUTION PLAN CHANGES AFTER A WAKEUP THRESHOLD TIME

(75) Inventors: Robert J. Bestgen, Rochester, MN (US); Robert V. Downer, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 12/885,847

(22) Filed: Sep. 20, 2010

(65) Prior Publication Data

US 2012/0072412 A1   Mar. 22, 2012

(51) Int. Cl.
*G06F 17/30* (2006.01)
(52) U.S. Cl. ........................ 707/706; 707/707
(58) Field of Classification Search .............. 707/604, 707/605, 606, 713, 718, 719
See application file for complete search history.

(56) References Cited

U.S. PATENT DOCUMENTS

| 5,345,585 | A | 9/1994 | Iyer et al. |
| 6,757,670 | B1 | 6/2004 | Inohara et al. |
| 7,167,852 | B1 | 1/2007 | Ahmed et al. |
| 7,321,888 | B2 | 1/2008 | Day et al. |
| 7,739,269 | B2 * | 6/2010 | Chaudhuri et al. ........... 707/718 |
| 2009/0094192 | A1 * | 4/2009 | Bestgen et al. .................. 707/2 |
| 2011/0055199 | A1 | 3/2011 | Siddiqui et al. |

OTHER PUBLICATIONS

Robert J. Bestgen, et al., U.S. Appl. No. 12/630,950, filed Dec. 4, 2009.

* cited by examiner

*Primary Examiner* — Baoquoc N To
(74) *Attorney, Agent, or Firm* — Owen J. Gamon

(57) ABSTRACT

In an embodiment an execution plan for a query is created. A wakeup threshold is set proportional to an amount of time taken by the creation of the execution plan. In various embodiments, the wakeup threshold is increased by a percentage equal to one minus a percentage of free resources at a computer system, is increased inversely proportional to an amount of execution time of a previous execution of the execution plan, or is decreased proportional to a number of times the execution plan was executed. A portion of the execution plan is executed to produce a portion of rows in a result set until the wakeup threshold expires. After the wakeup threshold expires, changes to the execution plan are evaluated.

19 Claims, 12 Drawing Sheets

EVALUATING EXECUTION PLAN CHANGES AFTER A WAKEUP THRESHOLD TIME

FIELD

An embodiment of the invention generally relates to computer systems and more particularly to database management systems that process queries with execution plans.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database (RDB), which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has one or more indexes, which are data structures that inform the DBMS of the location of a certain row in a table given an indexed column value, analogous to a book index informing the reader on which page a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as an execution plan. The DBMS often saves the execution plan and reuses it when the user or requesting program repeats the query, which is a common occurrence, instead of undergoing the time-consuming process of recreating the execution plan.

Many different execution plans may be created for any one query, each of which would return the same data set that satisfies the query, yet the different execution plans may provide widely different performance. Thus, the execution plan selected by the DBMS needs to provide the required data at a reasonable cost in terms of time and hardware resources. Hence, the DBMS often creates multiple prospective execution plans and then chooses the best, fastest, or least expensive one, to execute. One factor that contributes to the cost of a particular execution plan is the number of rows that the execution plan, when executed, returns from the database tables. One important aspect that influences the number of rows processed is the join order of the tables. In response to a query that requests data from multiple tables, the DBMS joins rows from these multiple tables (the rows are often concatenated horizontally in a result set), in order to find and retrieve the data from all the tables. Thus, a join operation is a relationship between two tables accessed by a query (a join query), and a join operation is performed to connect (or join) data from two or more tables, wherein the DBMS joins rows with particular attributes together to form a new row. The join order is typically specified by the execution plan and is the order in which the DBMS performs join operations when the DBMS executes the query via the execution plan to retrieve and join rows of data from the database tables into the result set.

Join operations are typically implemented using a nested loop algorithm, where the resultant new rows from the first two tables in the join order are joined to the resultant rows from the third table, and those results are joined to the fourth table, etc. Eventually all of the needed join operations are complete, and the resultant new rows are the result set that satisfies the query. Because a single join is limited to accessing two tables, multi-table joins are performed in sequence according to a particular order. Many different join queries may be implemented by joining the tables in any of several possible join orders. For example, a query that involves joining tables A, B, and C can often be performed as a join of tables A and B followed by a join of the results of table A joined to table B and table C. Alternatively, in many instances, the same query can be performed as a join of tables A and C followed by the join of the results of table A joined to table C and table B. The DBMS attempts to select a join order that will eliminate the greatest number of rows from the potential result set early in the join processing, which saves the costs associated with repeatedly accessing tables later in the join operation.

The DBMS often evaluates certain characteristics about the tables A, B, and C, in an attempt to determine the best join order for the query. In particular, during runtime, one join operation may have a high fan-out rate in which each row of table A matches multiple rows in table B. If this join is performed first, then each of these matching rows will need to be joined to table C, thereby requiring a significant number of intermediate operations. Conversely, the other join operation may have a high fan-in rate in which each row of table A matches very few or zero rows in table C. If this join operation is performed first, then only a few rows need to be joined with table B, thereby saving a number of intermediate operations.

SUMMARY

A method, computer-readable storage medium, and computer system are provided. In an embodiment an execution plan for a query is created. A wakeup threshold is set proportional to an amount of time taken by the creation of the execution plan. In various embodiments, the wakeup threshold is increased by a percentage equal to one minus a percentage of free resources at a computer system, the wakeup threshold is increased inversely proportional to an amount of execution time of a previous execution of the execution plan, the wakeup threshold is decreased proportional to a number of times the execution plan was executed if the execution plan executed more than a threshold number of times during a time period and an average execution time for the execution plan during the time period is less than an execution time threshold. A portion of the execution plan is executed to produce a portion of rows in a result set until the wakeup threshold expires. After the wakeup threshold expires, changes to the execution plan are evaluated. If a ratio of rows eliminated from the result set by successive joins of a first table and a second table is greater than a starvation threshold and a number of the portion of rows in the result set is more than a threshold difference from an estimated number of rows, then a determination is made whether an estimated cost of a forced primary join is less than an estimated cost of a star join. If the estimated cost of the forced primary join is less than the estimated cost of the star join, the second table is moved to be first in a join order in the execution plan, the portion of rows in the result set are discarded, and execution of the execution plan is restarted to produce a different portion of the rows.

It is to be noted, however, that the appended drawings illustrate only example embodiments of the invention, and are therefore not considered a limitation of the scope of other embodiments of the invention.

DETAILED DESCRIPTION

Figure 1:
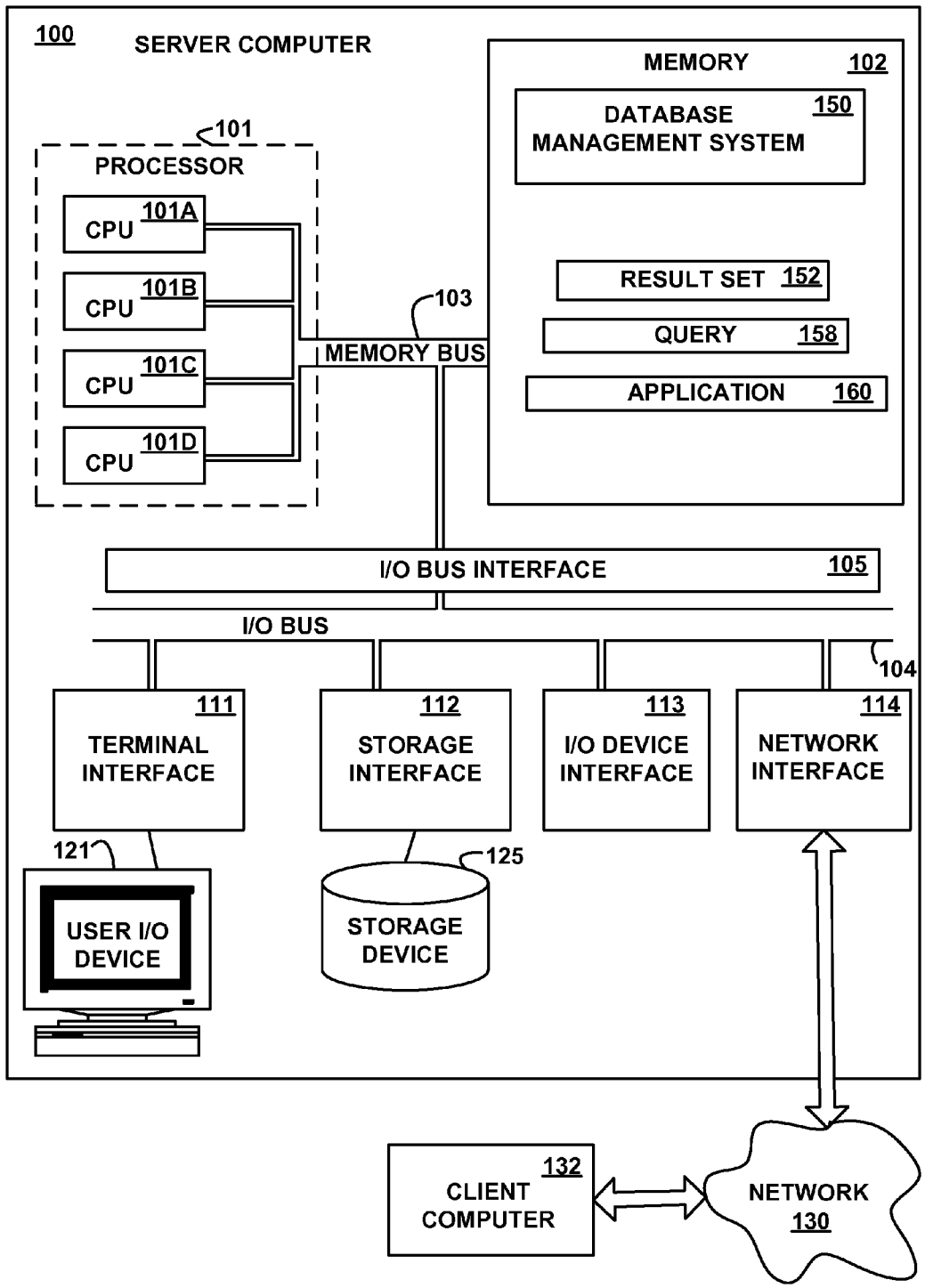
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a DBMS 150, a result set 152, a query 158, and an application 160. Although the DBMS 150, the result set 152, the query 158, and the application 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the DBMS 150, the result set 152, the query 158, and the application 160 are illustrated as being contained within the main memory 102, these elements are not necessarily all completely contained in the same storage device at the same time. Further, although the DBMS 150, the result set 152, the query 158, and the application 160 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, 9, 10, 11, and 12. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data in addition to instructions or statements. In various embodiments, the application 160 is a user application, a third-party application, an operating system, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function (s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments the invention.

Figure 2:
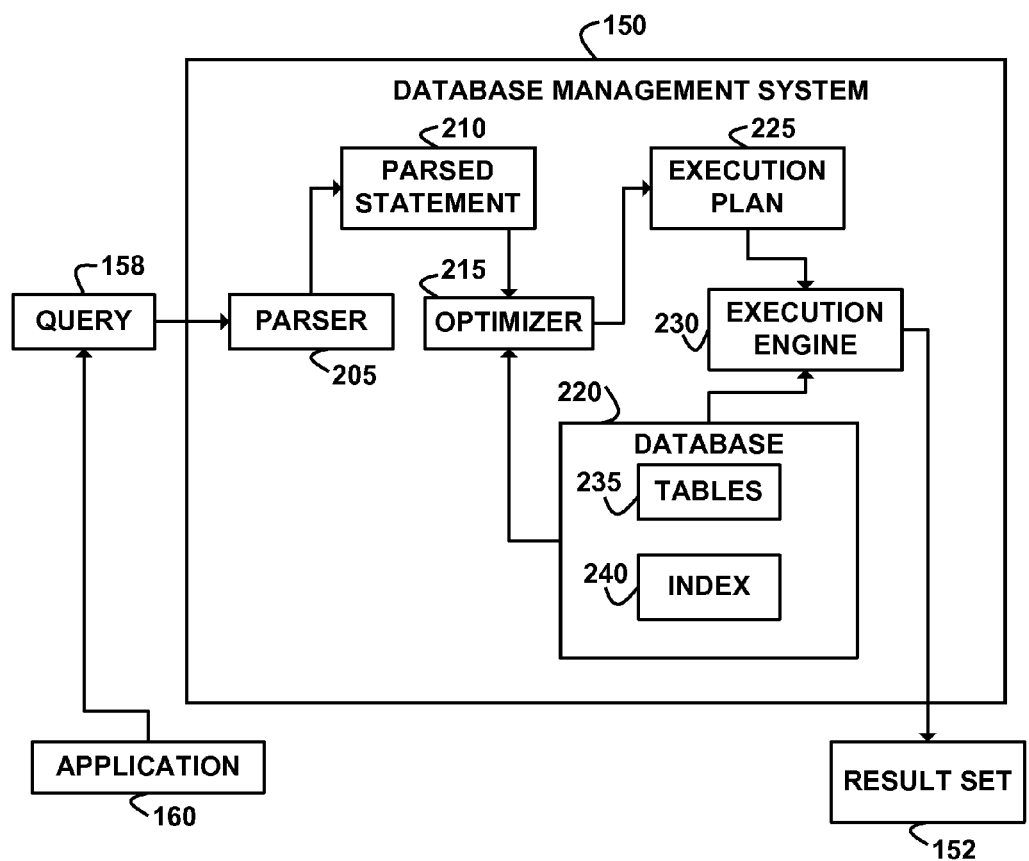
FIG. 2 depicts a block diagram of an example DBMS, according to an embodiment of the invention.

FIG. 2 depicts a block diagram of an example DBMS 150, according to an embodiment of the invention. The DBMS 150 comprises a parser 205, a query optimizer 215, an execution engine 230 and a database 220. The database 220 comprises tables 235 and one or more indexes 240. The tables 235 organizes data in rows, which represent individual entries, tuples, or records and columns, fields, or attributes, which define what is stored in each row, entry, tuple, or record. Each table 235 has a unique name within the database 220 and each column has a unique name within the particular table 235. The index 240 is a data structure that informs the DBMS 150 of the location of a certain row in a table 235 given an indexed column value.

The parser 205 in the DBMS 150 receives the query command 158 from the application 160. The query command 158 requests that the DBMS 150 search for or find a row or combination of rows of data and store the data from those found rows into the result set 152 that meet or satisfy the criteria, keys, and or values specified by the query command 158. In an embodiment, the application 160 sends the same query command 158 multiple times to the DBMS 150, which may or may not result in a different result set 152, depending on whether the data in the DBMS 150 has changed between occurrences of the query 158. The parser 205 generates a parsed statement 210 from the query 158, which the parser 205 sends to the query optimizer 215. The optimizer 215 performs query optimization on the parsed statement 210. As a result of query optimization, the optimizer generates the execution plan 225, using data such as platform capabilities, query content information, etc., that is stored in the database 220. Once generated, the optimizer 215 sends the execution plan 225 to the execution engine 230, which executes the database query using the execution plan 225 and the index 240, in order to find and retrieve the data in the database tables 235 in the database 220 that satisfies the criteria of the query. The execution engine 230 stores the resultant data that satisfies the criteria specified by the database query into the result set 152, which is returned to the application 160 as a response to the query 158. In an embodiment, the DBMS 150 stores various thresholds into the execution plan 225. The DBMS 150 may receive the various thresholds from the application 160, from a user, or from a database administrator, or the thresholds may be set by a designer of the query optimizer 215.

Figure 3:
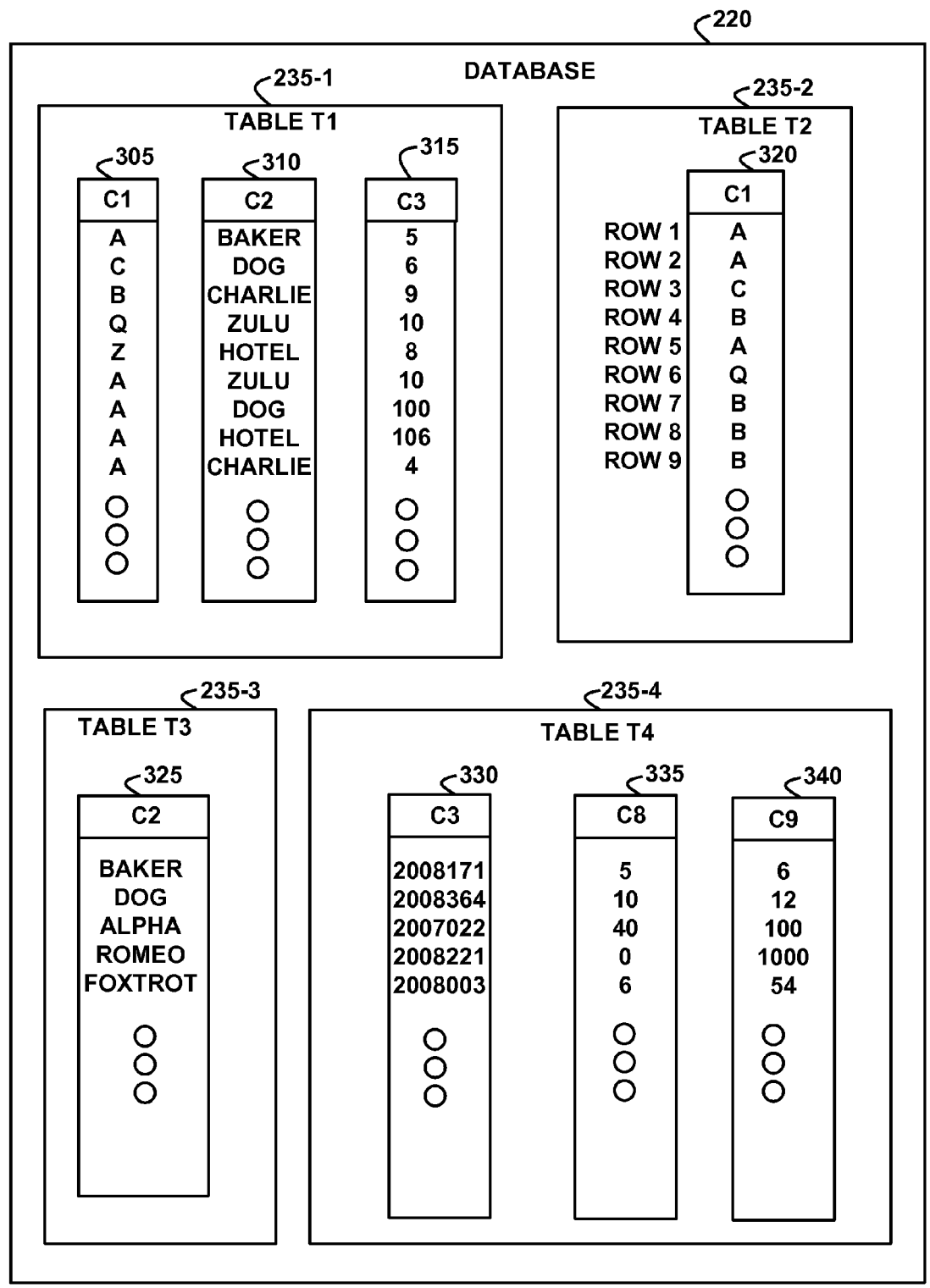
FIG. 3 depicts a block diagram of an example data structure for a database, according to an embodiment of the invention.

FIG. 3 depicts a block diagram of an example data structure for a database 220, according to an embodiment of the invention. The example database 220 comprises example tables t1 235-1, t2 235-2, t3 235-3, and t4 235-4. The table 235-1 comprises columns c1 305, c2 310, and c3 315. The table t2 235-2 comprises the column c1 320. The table 235-3 comprises the column c2 325. The table 235-4 comprises the columns c3 330, c8 335, and c9 340. Columns 305 and 320 share the same column name or identifier "c1," columns 310 and 325 share the same column name or identifier "c2," and columns 315 and 330 share the same column name or identifier "c3." The columns are uniquely identified herein using the notation t1.c1 (referring to column 305 in table 235-1), t1.c2 (referring to column 310 in table 235-1), t1.c3 (referring to column 315 in table 235-1), t2.c1 (referring to column 320 in table 235-2), t3.c2 (referring to column 325 in table 235-3), t4.c3 (referring to column 330 in table 235-4), t4.c8 (referring to column 335 in table 235-4), and t4.c9 (referring to column 340 in table 235-4).

Thus, each table in the example database 220 is divided into rows and columns. For example, the table T1 235-1 comprises a first row of (A, BAKER, 5) with "A" stored in the column c1 305, "BAKER" stored in the column c2 310, and "5" stored in the column c3 315; a second row of (C, DOG, 6) with "C" stored in the column c1 305, "DOG" stored in the column c2 310 and "6" stored in the column c3 315; a third row of (B, CHARLIE, 9) with "B" stored in the column c1 305, "CHARLIE" stored in the column c2 310 and "9" stored in the column c3 315; a fourth row of (Q, ZULU, 10) with "Q" stored in the column c1 305, "ZULU" stored in the column c2 310 and "10" stored in the column c3 315; a fifth row of (Z, HOTEL, 8) with "Z" stored in the column c1 305, "HOTEL" stored in the column c2 310 and "8" stored in the column c3 315; a sixth row of (A, ZULU, 10) with "A" stored in the column c1 305, "ZULU" stored in the column c2 310, and "10" stored in the column c3 315; a seventh row of (A, DOG, 100) with "A" stored in the column c1 305, "DOG" stored in the column c2 310, and "100" stored in the column c3 315; an eighth row of (A, HOTEL, 106) with "A" stored in the column c1 305, "HOTEL" stored in the column c2 310, and "106" stored in the column c3 315; and a ninth row of (A, CHARLIE, 4) with "A" stored in the column c1 305, "CHARLIE" stored in the column c2 310, and "4" stored in the column c3 315, etc.

As another example, the table T2 235-2 comprises a first row of (A) stored in the column c1 320, a second row of (A) stored in the column c1 320, a third row of (C) stored in the column c1 320, etc. The Table T2 235-2 illustrated row identifiers ("row 1," "row 2," etc.), which identify the respective rows in the table. In another embodiment, the row identifiers are addresses (either absolute, relative, physical, logical, or virtual addresses) that identify the storage location of the respective row. In an embodiment, the row identifiers are pointed to by addresses or identifiers in the index 240. Although only the table 235-2 explicitly illustrates the row identifiers, they exist for all of the tables and rows.

Figure 4:
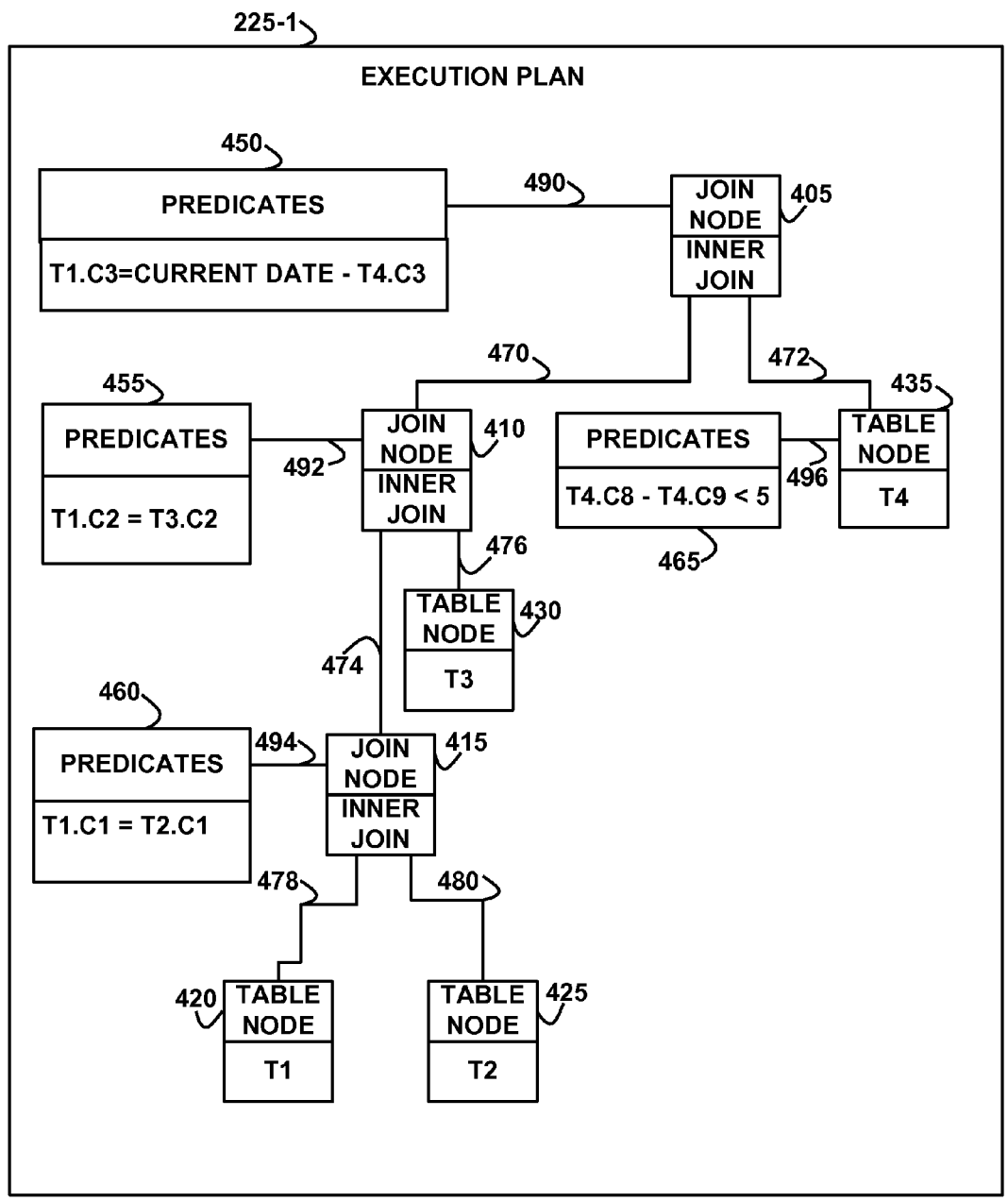
FIG. 4 depicts a block diagram of an example execution plan for a first query implemented with an original join order, according to an embodiment of the invention.

FIG. 4 depicts a block diagram of an example execution plan 225-1 for a first query implemented with an original join order, according to an embodiment of the invention. In an embodiment, the execution plan 225-1 comprises a tree graph, representing the join operations that implement the query when executed. The tree graph of the execution plan 225-1 comprises join nodes 405, 410, and 415; table nodes 420, 425, 430, and 435; predicates 450, 455, 460, and 465; links 470, 472, 474, 476, 478, and 480; and links 490, 492, 494, and 496. The table node 420 represents the table 235-1. The table node 425 represents the table 235-2. The table node 430 represents the table 235-3. The table node 435 represents the table 235-4.

A tree graph takes its name from an analogy to trees in nature, which have a hierarchical organization of branches and leaves. For example, a leaf is connected to a small branch, which further is connected to a large branch, and all branches of the tree have a common starting point at the root. Analogously, the nodes 405, 410, 415, 420, 425, 430, and 435 in the tree graph of the execution plan 225-1 have a hierarchical organization, in that the join node 405 has a relationship with another join node 410, which itself may have a further relationship with another node, and so on. Thus, the nodes may be divided into groups and sub-groups, which ultimately all have a relationship to the root or head node 405. To define a tree more formally, a tree data structure defines the hierarchical organization of nodes. Hence, a tree is a finite set, T, of one or more of nodes, such that a) one specially designated node is called the root of the entire tree; and b) the remaining nodes (excluding the root) are partitioned into m>=0 disjoint sets T1, ... Tm, and each of these sets is in turn a tree. The trees T1, ..., Tm are called the subtrees of the root. Thus, every node in a tree is the root of some subtree contained in the whole tree. The number of subtrees of a node is called the degree of that node. A node of degree zero is called a terminal compute node or a leaf. A non-terminal node is called a branch node. The level of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node.

Thus, using the example tree of the execution plan 225-1 of FIG. 4, the root node is the node 405. The root node 405 is the parent of its child nodes 410 and 435. The node 410 is the parent of its child nodes 415 and 430. The node 415 is the parent of its child nodes 420 and 425. The nodes 420, 425, 430 and 435 have no child nodes, so they are leaf nodes. The ancestors of the node 420 are the nodes 415, 410, and 405. The ancestors of the node 415 are the nodes 410 and 405. The ancestor of the node 410 is the node 405. The ancestors of the node 425 are the nodes 415, 410, and 405. The ancestors of the node 430 are the nodes 410 and 405. The ancestor of the node 435 is the node 405. The root node 405 has no ancestors. The links 470, 472, 474, 476, 478, and 480 each connect, point to, or contain the address of two adjacent nodes, and allow the DBMS 150 to find the child nodes of a parent node and find the parent node of a child node. The links 490, 492, 494, and 496 each connect to, point to, or contain the address of a predicate, and allow the DBMS 150 to find the predicate of a node. In this example, the example query that the example execution plan 225-1 implements may be expressed as: "select * from t1, t2, t3, t4 where t1.c1=t2.c1 and t1.c2=t3.c2 and t1.c3=current date−t4.c3 and t4.c8=t4.c9<5." The tree graph of the execution plan 225-1 illustrates one example implementation and one example join order for the example query, but other implementations and join orders for this query also exist, including embodiments that do not use a tree and that do not use a graph.

Each of the predicates 450, 455, 460, and 465 is connected to one of the nodes. The predicates each represent a portion of the query and comprise respective conditional criteria expressions, which the DBMS 150 evaluates to either true or false by substituting data from the rows retrieved from the table nodes (that are connected to the predicate or that are the child node of a join node that is connected to the predicate) into variables in the expression that match column identifiers in the rows. In various embodiments, the predicates specify any multiple, and/or combination of: data; columns, fields, or keys; functions, calls, invocations, methods, classes, or applets; relational operators (e.g., greater than, less than, equal to, not equal to, greater than or equal to, less than or equal to, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); and register operations (e.g., shift left, shift right operations, or any other register operation); and the relational operators, the logical operators, the arithmetic operators, and the register operations may have any number of arguments or operands (e.g., they may be unary, binary, ternary, or n-ary).

The DBMS 150 reads a join node, and in response, reads a row from a child table node or nodes of the join node, substitutes the data from the columns in the read row(s) that has the same table and column identifier as specified in the predicate that is connected to the join node, and evaluates the resultant predicate expression to either true or false. If the predicate expression evaluates to true, then the read row satisfies or meets the connected predicate, so the DBMS 150 saves the read row to the result set 152. If the predicate expression evaluates to false, then read row does not satisfy or meet the predicate, so the DBMS 150 excludes the read row from the result set 152.

The join nodes represents join operations of tables whose rows satisfy the connected predicate. In various embodiments, the join operations may comprise inner joins, equi-joins, natural joins, outer joins, left outer joins, right outer joins, full outer joins, exception joins, and self joins. An inner join between two tables results in only the rows matching certain selection criteria to be returned in the result set 152. An outer join, such as a left join of table A and table B (according to a set of selection criteria) returns all matching rows as well as those rows in table A not having a match in table B. The matching rows have the values of all their fields populated by the data from table A and table B. But, the non-matching rows from table A will have a null value, or other default character, in the fields from table B. Another outer join, such as a right join of table A and table B, also returns all the matching rows but, unlike the left join, returns those rows in table B not having a matching row in table A. An exception join of table A and table B returns a result set of those rows in table A for which no matching row in table B exists.

The join node 415 represents a join operation of the tables represented by the child table nodes 420 and 425 using the connected predicates 460. The join node 410 represents a join operation of the tables represented by the child table node 430 and an intermediate result set created by the child join node 415 using the predicates 455. The join node 405 represents a join operation of the table represented by the child table node 435 and an intermediate result set created by the child join node 410, using the predicates 450 and 465. In an embodiment, the join nodes represent logic in the DBMS 150 that performs the join operation that finds rows in the child table nodes, whose column values satisfy the criteria of the predicates when the logic of the join node substitutes the column values of the found rows into the placeholders or variables in the predicates that have the same name or identifier as the column identifiers in the rows.

In operation, the DBMS 150 executes the query using the execution plan 225-1 as follows. The DBMS 150 begins traversing the nodes at the root or head node and encounters (reads) the head node 405 (the join node 405). Since the join node 405 is not a table node, the DBMS 150 travels to left child join node 410 of the join node 405 via the link 470, in search of a first row. The DBMS 150 encounters (reads) the join node 410. Since the join node 410 is not a table node, the DBMS 150 again travels to the left child node 415 of the node 410 via the link 474, in search of a first row. The DBMS 150 encounters the join node 415. Since the join node 415 is not a table node, the DBMS 150 again travels to the left child node 420 of the node 415 via the link 478, in search of a first row. The DBMS 150 encounters the table node 420 and retrieves the first row from the table represented by the table node 420, using a scan operation. In a scan operation, the DBMS 150 reads rows from the beginning to the end of a table, without using the index 240 to randomly access the table.

The DBMS 150 then travels to the right child node 425 of the node 415, encounters (reads) the table node 425 and searches for a second row in the table identified by the table node 425 that satisfies the selection criteria of the connected predicate 460 of the join node 415. If the DBMS 150 does not find a second row in the table identified by the table node 425 that satisfies the selection criteria of the connected predicate 460 of the join node 415, then the DBMS 150 returns to the table node 420 and scans the table for the next row and returns to the table node 425 and once again searches for a second row in the table identified by the table node 425 that satisfies the selection criteria of the predicate 460 of the join node 415.

Once a matching row in the table identified by the table node 425 is identified that satisfies the selection criteria of the predicate 460, the DBMS 150 returns the found first row (read in a scan operation from the table represented by the node 420) and second row (read from the table node 425) in an intermediate result set to the join node 410. The DBMS 150 then travels to the right child table node 430 and searches for a third row in the table t3 identified by the table node 430 that satisfies or meets the predicates 455. Notice that, in determining whether or not a row in the table T3 satisfies the predicates 455, the DBMS 150 uses the first row that was found in the table node t1 and was returned in the intermediate result set, in order to compare t1.c2=t3.c2. If the DBMS 150 does not find a row in the table t3 that satisfies the predicates 455 for the intermediate result set returned from the join node 415, then the DBMS 150 returns to the join node 415 and re-performs the join 415, retrieving the next row from the table t1 and finding a row in the table t2 that satisfies the predicate 460 before returning to the join node 410 and once again searching for a third row in the table t3 that meets the predicates 455.

Once the DBMS 150 has found a third row in the table t3 that satisfies the criteria of the predicates 455, the DBMS 150 returns the intermediate result set of the first row from the table t1, the second row from the table t2, and the third row from the table t3 that meets the criteria of the predicates 455 and 460 to the join node 405. The DBMS 150 then travels to the right child node 435 of the join node 405, encounters (reads) the table node 435 and searches for a fourth row in the table t4 identified by the table node 435 that satisfies the criteria of the predicates 450 and 465 while using the rows in the intermediate result set to perform the comparison of the predicates 450 and 465.

The DBMS 150 scans all rows in the table t4, and then processing of the DBMS 150 returns back to the join node 410, which ensures that all rows in the table t3 are scanned for the current rows retrieved from the tables t1 and t2. Once all rows in the table t3 are scanned and any matches are processed further by the DBMS 150 at the join node 405, the DBMS 150 returns to the join node 415, retrieves the next row from the table t1, and repeats the aforementioned sequence of operations. Thus, the table node 420 representing the table t1 235-1 is the first table in the join order of the execution plan 225-1 because the DBMS 150 scans rows from the table t1 235-1 prior to reading rows from any of the other tables (represented by the nodes 425, 430, and 435) in the join order. The table t2 235-2 represented by the node 425 is second in the join order because the DBMS 150 reads rows from the table t2 235-2 after reading rows from the table t1 in order to determine if the predicates 460 are satisfied and prior to reading rows from the table t3 and t4, represented by the respective nodes 430 and 435. The table t3 235-3 represented by the node 430 is third in the join order because the DBMS 150 reads rows from the table t3 235-3 after reading rows from the table t1 and t2, in order to determine if the predicates 455 are satisfied and prior to reading rows from the table t4. The table t4 235-4 represented by the node 435 is fourth, or last, in the join order because the DBMS 150 reads rows from the table t4 235-4 last after reading rows from the tables t1, t2, and t3, in order to determine if the predicates 450 and 465 are satisfied.

A tree graph, with parent and child nodes, is merely a logical representation of a query execution, which aids in understanding how the execution engine 230 executes a particular query. But, the execution plan 225 generated by the query optimizer 215 may comprise code understandable and executable by the execution engine 230. This code does not require parent nodes and child nodes but, instead, comprises logic that is represented by a tree graph model having such nodes and connections and may be implemented as other types of data structures as well. Accordingly, while embodiments of the invention have been described herein using such tree graph terminology, actual creation and modification of a tree graph are not required.

Figure 5:
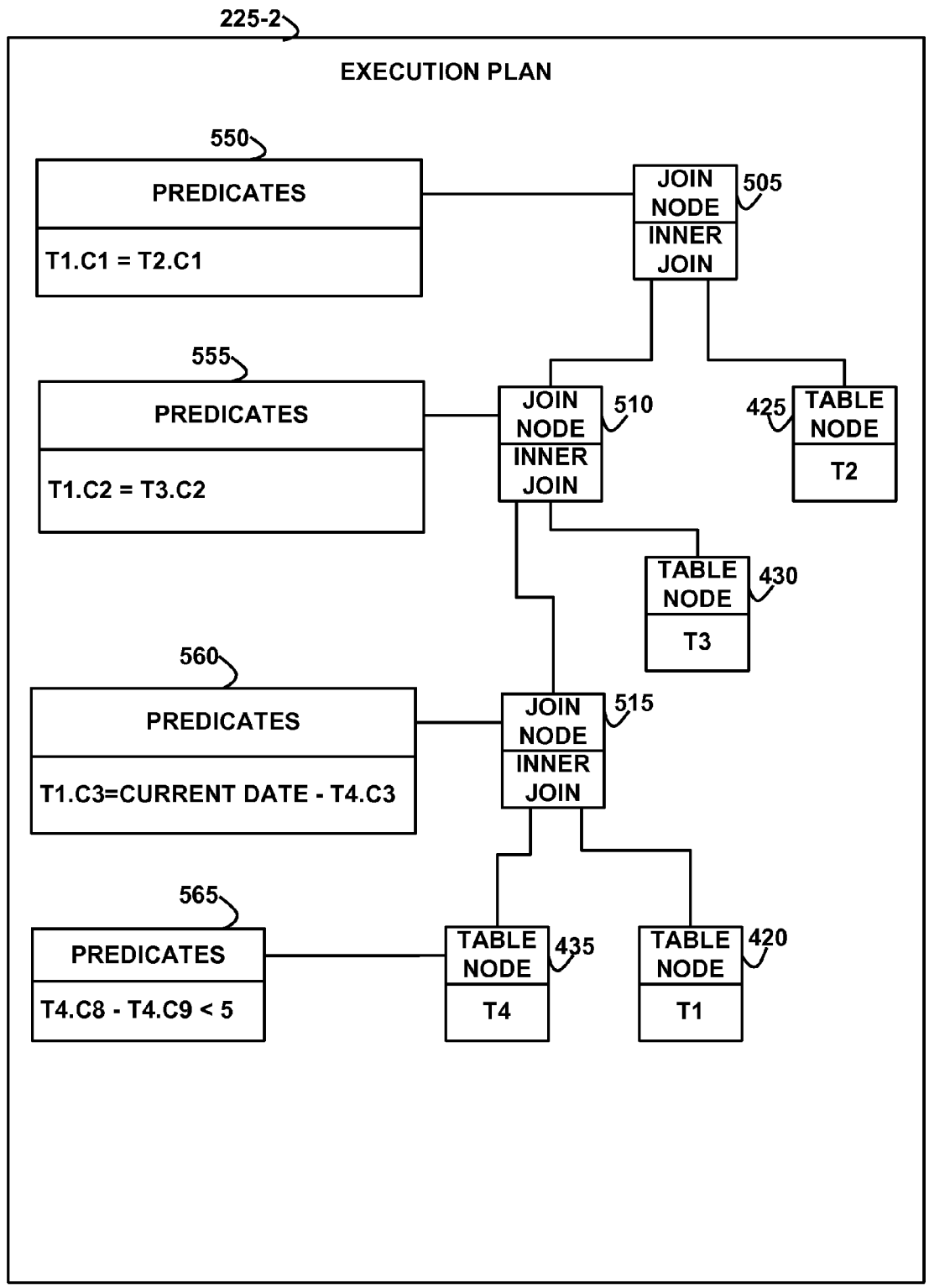
FIG. 5 depicts a block diagram of another example execution plan for the first query with a forced primary join order, according to an embodiment of the invention.

FIG. 5 depicts a block diagram of another example execution plan 225-2 for the first query with a forced primary join order, according to an embodiment of the invention. The DBMS 150 has modified the execution plan 225-2 from the execution plan 225-1 (FIG. 4) to move (force) the table node t4 435 to be the first (left-most or primary) table node in the join order of the execution plan 225-2. In this example, the query that the execution plan 225-1 implements is the same as the query implemented by the execution plan 225-1 (FIG. 4). The tree graph of the execution plan 225-2 comprises join nodes 505, 510, and 515; table nodes 420, 425, 430, and 435; and predicates 550, 555, 560, and 565. The table node 420 represents the table 235-1. The table node 425 represents the table 235-2. The table node 430 represents the table 235-3. The table node 435 represents the table 235-4.

Each of the predicates is connected to one of the join nodes. The predicates 550, 555, 560, and 565 each represent a portion of the query and comprise respective conditional criteria expressions, which the DBMS 150 evaluates to either true or false by substituting data from the rows retrieved from the table nodes (child nodes of the connected join nodes) into variables or placeholders in the expression that match (are the same as or identical to) column identifiers in the rows. The join node 515 represents a join operation of the tables represented by the child table nodes 435 and 420 using the connected predicates 565. The join node 510 represents a join operation of the tables represented by the child table node 430 and an intermediate result set created by the child join node 515, using the predicates 555. The join node 505 represents a join operation of the table represented by the child table node 425 and an intermediate result set created by the child join node 510, using the predicates 550.

The DBMS 150 executes the query using the execution plan 225-2, in an operation analogous to that described above for the execution plan 225-1, but with a different join order where the table node 435 representing the table t4 235-4 is the first table in the join order because the DBMS 150 scans rows from the table t4 235-4 prior to reading rows from any of the other tables; the table t1 235-1 represented by the node 420 is second in the join order because the DBMS 150 reads rows from the table t1 235-1 after reading rows from the table t4, in order to determine if the predicates 560 and 565 are satisfied and prior to reading rows from the table t3 and t2. The table t3 235-3 represented by the node 430 is third in the join order because the DBMS 150 reads rows from the table t3 235-3 after reading rows from the table t4 and t1, in order to determine if the predicate is 555 are satisfied and prior to reading rows from the table t2. The table t2 235-2 represented by the node 425 is fourth, or last, in the join order because the DBMS 150 reads rows from the table t2 235-2 last after reading rows from the tables t4, t1, and t3, in order to determine if the predicates 550 are satisfied.

Figure 6:
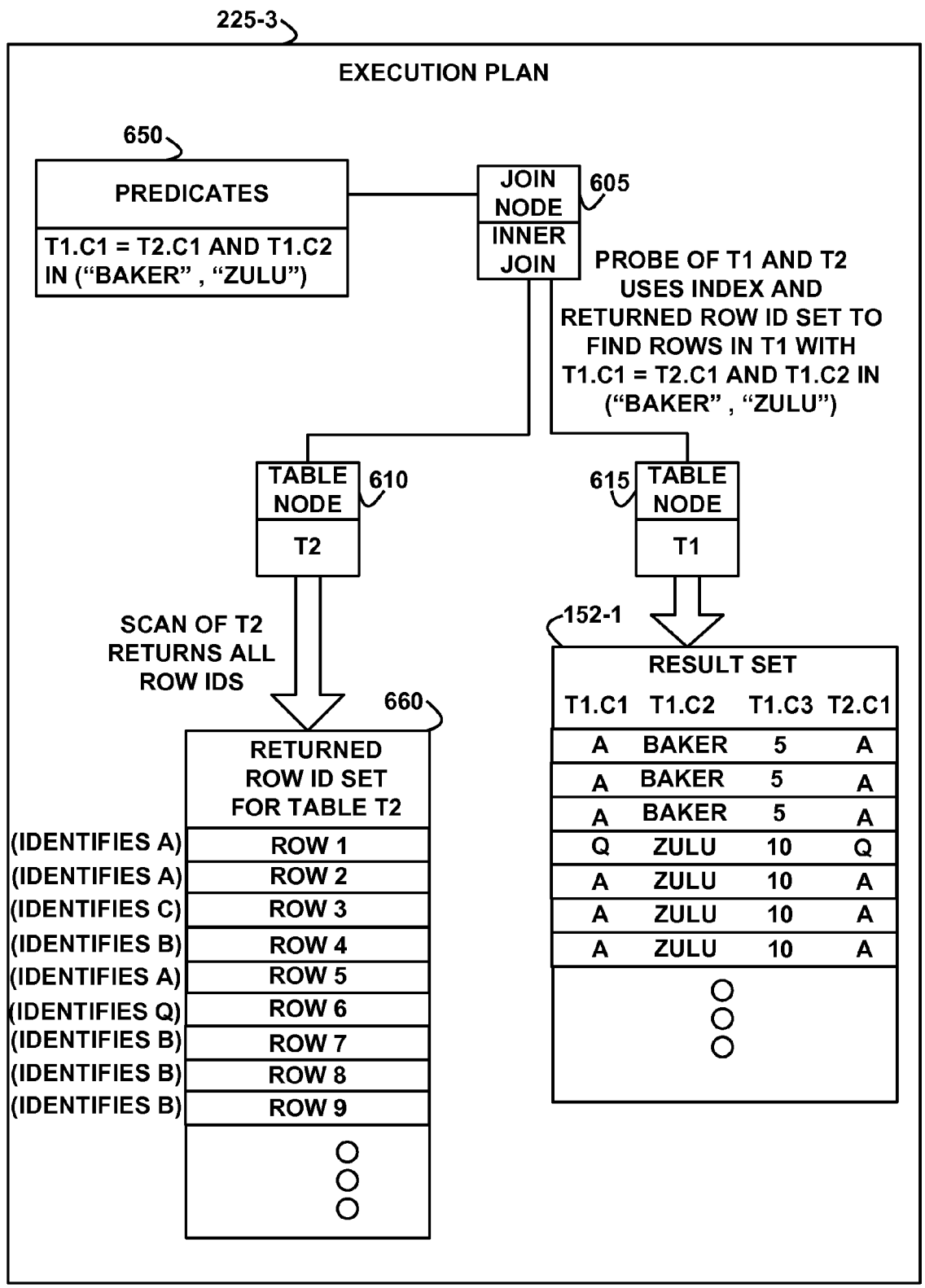
FIG. 6 depicts a block diagram of an example execution plan for a second query with an original join order, according to an embodiment of the invention.

FIG. 6 depicts a block diagram of an example execution plan for a second query with an original join order, according to an embodiment of the invention. The example execution plan 225-3 comprises a tree graph, which is a data structure that represents the join operation that implements a query. In this example, the query, which the execution plan 225-3 implements may be represented as: "select * from t1, t2 where t1.c2 in ("BAKER", "ZULU") and t1.c1=t2.c1." The tree graph of the execution plan 225-3 illustrates one example implementation and one example join order for the example query, but other implementations and join orders for this query also exist. The tree graph of the execution plan 225-3 comprises the join node 605; the table nodes 610 and 615; and the predicates 650. The table node 610 represents the table t2 235-2. The table node 615 represents the table t1 235-1. The predicate 650 is connected to the join node 605. The join node 605 represents a join operation of the tables represented by the child table nodes 610 and 615 using the predicates 650.

In operation, the DBMS 150 executes the query using the execution plan 225-3 as follows. The DBMS 150 begins traversing the nodes and encounters (reads) the head join node 605. Since the join node 605 is not a table node, the DBMS 150 reads the predicates 650 and travels to left child node 610 of the join node 605, in search of rows that satisfy the predicates 650. The DBMS 150 encounters (reads) the table node 610. Since the join node 610 is a table node, the DBMS 150 retrieves the rows from the table represented by the table node 610, using a scan operation, that satisfy the predicates 650 and returns the row identifiers that represent the scanned rows to the join node 605 in the returned row identifier set 660. Scan operations read rows from the beginning to the end of a table, i.e., non-randomly, without using the index 240 to randomly access the table. In the illustrated example, the DBMS 150 scans the table t2 and returns the returned row identifier set 660 with row identifiers from the table t2 that contain all values in the column c1 because the predicates 650 do not restrict the values in t2.c1 until rows from table t1 have also been read.

The DBMS 150 then travels to the right child node of the join node 605, encounters the table node 615 and uses the index 240 to find rows in the table t1 that contain t1.c1 values that equal the t2.c1 values in rows identified by the returned row identifier set 660 where t1.c2 is a member of ("BAKER", "ZULU"), i.e., those t1.c1 and t2.c1 values that satisfy the predicates 650. The DBMS 150 finds the rows via probe operations that directly and randomly access the table t2 via the row identifiers of the returned row identifier set 660, that submit the key t1.c2 and the key values ("BAKER", "ZULU") to the index 240, and that submit the t1.c1 key and the t2.c1 values as key values (in order to find the rows that satisfy the "t1.c1=t2.c1" predicate) to the index.

Thus, execution of the execution plan 225-3 results in the result set 152-1, which includes the joined values of rows from t1.c1, t1.c2, t1.c3, and t2.c1. The execution of the execution plan 225-3 causes the result set 152-1 to include duplicate rows because each row in t1.c1 with a value of "A" matches (contains the same or identical value as) three rows in t2.c1. The result set 152-2 is an example of the result set 152 (FIG. 1). Note that the join operation eliminates rows from the result set when the join performs its operation against the table node 615, i.e., the returned row identifier set 660 identifies more rows than are included in the result set 152-1.

Figure 7:
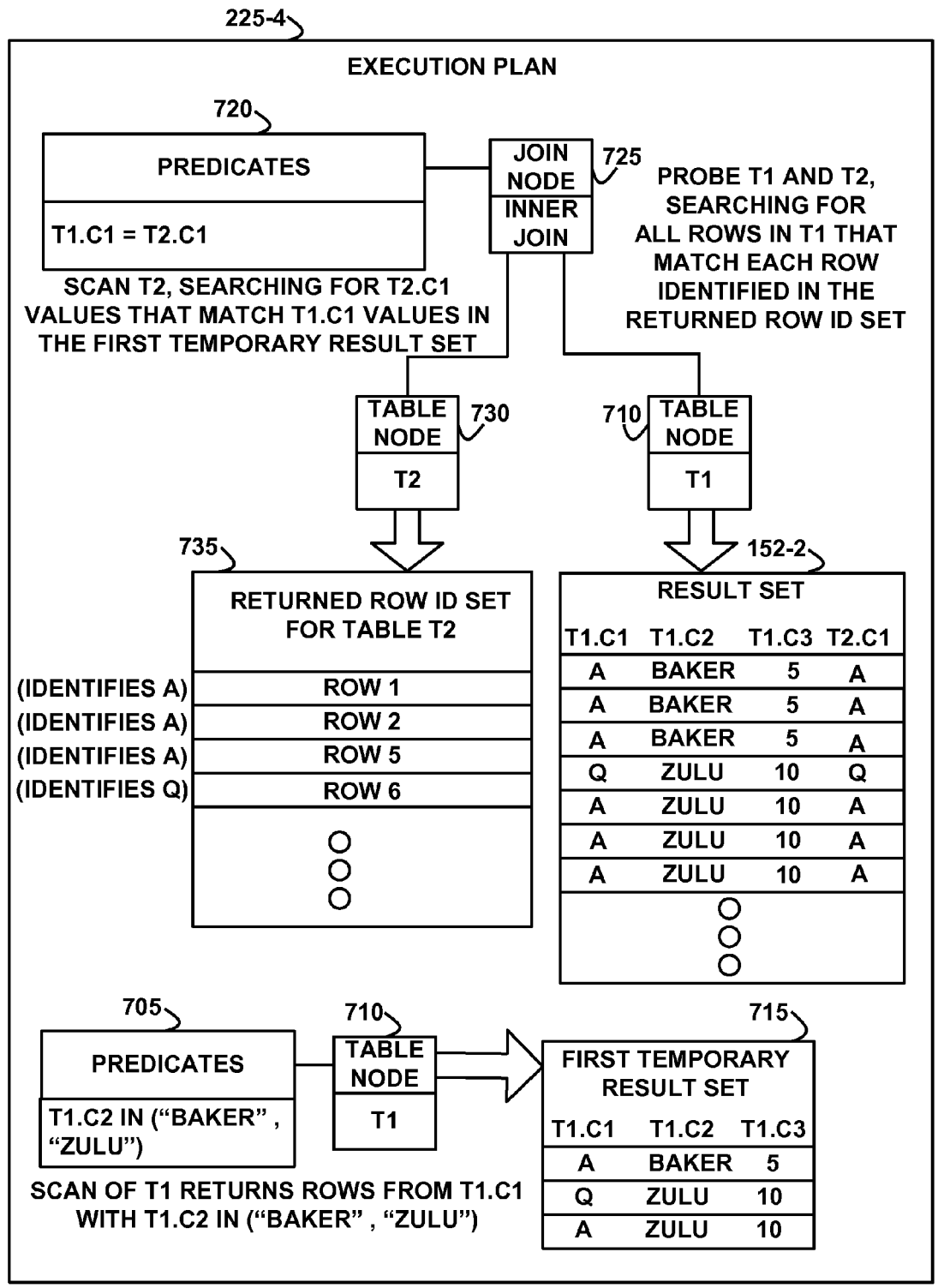
FIG. 7 depicts a block diagram of another example execution plan for the second query with a star join order and pre-selection, according to an embodiment of the invention.

FIG. 7 depicts a block diagram of another example execution plan 225-4 for the second query with a star join order and pre-selection, according to an embodiment of the invention. The execution plan 225-4 implements the same example query as does the execution plan 225-3. In a star join, one or more dimension tables are joined to a fact table. The tree in a star join schematically resembles a star, and is named as such due to the dimension tables appearing as points of a star surrounding the central fact table, in a graphical representation of the tree. In an embodiment, the dimension tables comprise a simple primary key, while the fact tables comprise a compound primary key consisting of the aggregate of relevant dimension keys. A primary key (also called a unique key) uniquely identifies each row in a table. A simple primary key comprises a single column in the table and is unique, meaning that no two distinct rows in the table can have the same value in that column. A compound key is a key that consists of two or more columns that uniquely identify a row where each column (attribute) that makes up the compound key is a simple primary key in its own right. A compound key is distinguished from a composite key, which is a key that comprises two or more columns (attributes) that uniquely identify a row where at least one column (attribute) that makes up the composite key is not a simple primary key. In another embodiment, the table that returns the most number rows (in response to the query) and has little or no local selection is the fact table, and the table(s) that return less than the most number of rows (in response to the query) and have local selection are the dimension table(s).

In the example of FIG. 7, the table node 710 (representing the table T1), represents the dimension table and has local selection, meaning that the predicates 705 specify and select only on values in the columns in the table node 710 representing the table t1 and do not specify columns in any other table. The table node 730 (representing the table T2) represents the fact table, which does not have local selection because the predicates 720, which the join node 725 uses to select from the table T2 represented by the table node 730, specify columns in more than one table (in both tables t1 and t2).

In operation, the DBMS 150 executes the query using the execution plan 225-4 as follows. First, the DBMS 150 performs pre-selection by reading the predicates 705 that are connected to the table 710, and in response, scans the table T1, returning rows from t1.c1 that satisfy the predicates 705 (i.e., the rows from table T1 with t1.c2 in ("BAKER", "ZULU")), which yields the first temporary result set 715, which comprises the values of t1.c1, t1.c2, and t1.c3 that are in rows whose t1.c2 values are either "BAKER" or "ZULU." The DBMS 150 then reads the tree, starting at the head node (the join node 725). In response to reading the head node 725, the DBMS 150 reads the connected predicates 720 and travels to the left child node of the join node, encountering and reading the table node 730. In response to reading the table node 730, the DBMS 150 scans the table t2, searching for t1.c1 and t2.c1 values that satisfy the predicates 720 (i.e., searching for t2.c1 values that match t1.c1 values that are in the first temporary result set 715), yielding the returned row identifier set 735, which includes row identifiers of rows in the table t2, whose t2.c1 values satisfy the predicates 720.

The DBMS 150 returns the returned row identifier set 735 to the join node 725, and in response, travels to the right child node 710 and reads the right child node 710. In response, the DBMS 150 then probes the tables t1 and t2, searching for all rows in table t1 where the t1.c1 value equals the t2.c1 value in the rows that are identified by the returned row identifier set 735, yielding the result set 152-2, which is an example of the result set 152 (FIG. 1). The DBMS 150 reads a row identifier from the returned row identifier set 735, accesses the row in the table t2 directly by the identifier, reads the value of t2.c1 in the accessed row, and submits the read value as a key value along with the key t1.c1 to the index 240, in order to retrieve a row or rows in t1 that contain a value in t1.c2 that matches the value from t2.c1. The DBMS 150 then saves the values of t1.c1, t1.c2, t1.c3, and t2.c1 to the result set 152-2. The DBMS 150 repeats these probe operations for each row identifier in the returned row identifier set 735. In a probe operation, the DBMS 150 retrieves a row from a table via a random access operation using the index 240 and a key or column value into the index to directly retrieve the indexed row from the table, without needing to scan the table from beginning to end. Thus, the DBMS 150 performs the scan of the table T1 identified by the table node 710 to create the first temporary result set 715 prior to scanning the table t2 identified by the table node 730, even though the table node 730 is specified first in the join order of the tree and the table node 710 is specified last in the join order of the tree, hence the designation of "pre-selection."

Figure 8:
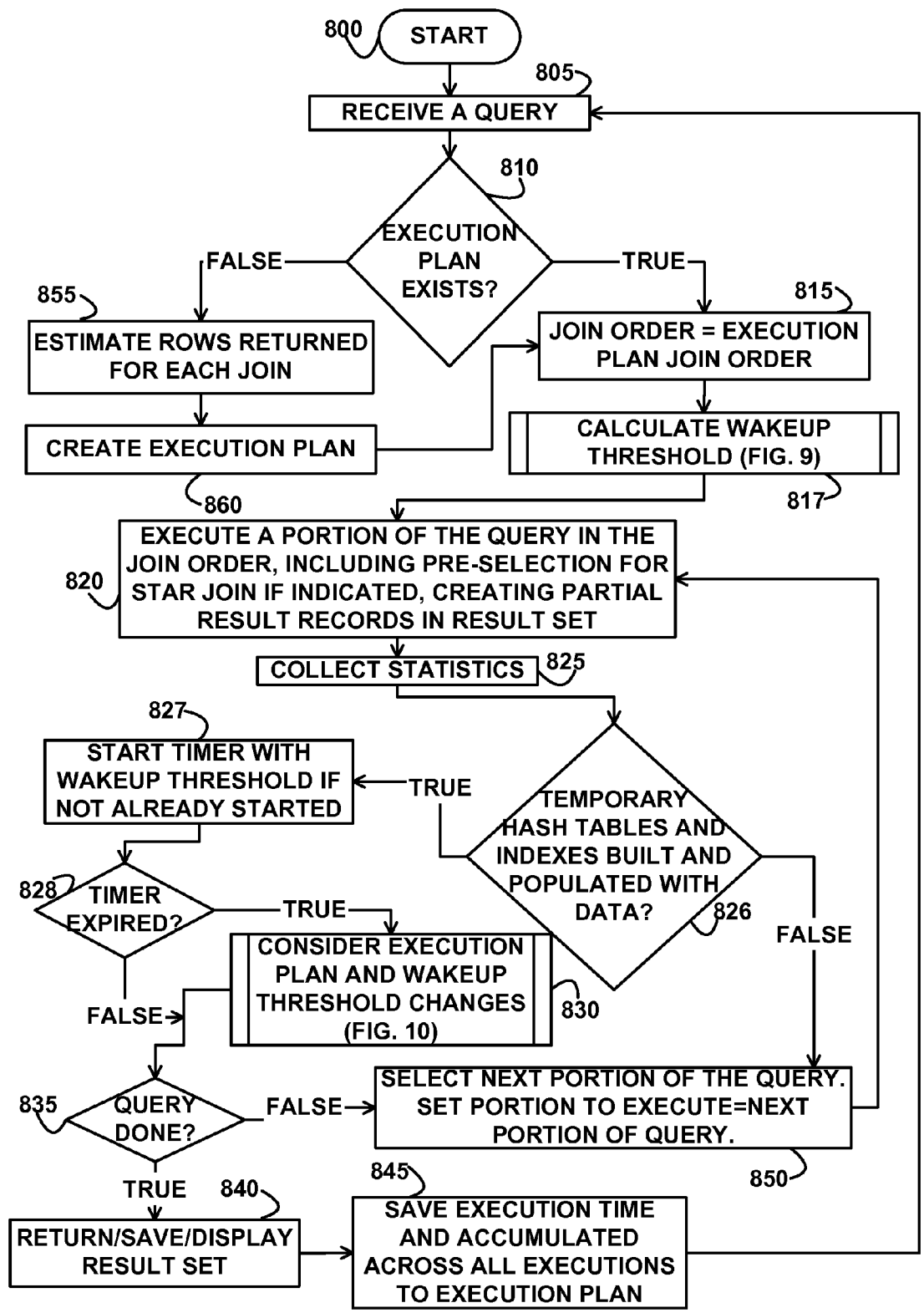
FIG. 8 depicts a flowchart of example processing for a query, according to an embodiment of the invention.

FIG. 8 depicts a flowchart of example processing for a query, according to an embodiment of the invention. Control begins at block 800. Control then continues to block 805 where the application 160 sends a query, and the DBMS 150 receives the query. Control then continues to block 810 where the DBMS 150 determines whether an execution plan 225 already exists that implements the query. If the determination at block 810 is true, then an execution plan 225 already exists, which the DBMS 150 previously created, that implements the query, so control continues to block 815 where the DBMS 150 sets the join order for the query to be the pre-existing join order stored in the execution plan 225. Control then continues to block 817 where the DBMS 150 calculates the wakeup threshold time period, as further described below with reference to FIG. 9.

Control then continues to block 820 where the DBMS 150 executes a portion of the steps specified by the execution plan for the query 158 in the join order, including pre-selection for star join if such is indicated by the execution plan 225, as previously described above with reference to FIG. 7. The DBMS 150 stores rows in the result set 152 that result from the execution of the portion of the execution plan 225. In an embodiment, the DBMS 150 selects a portion of the query 158 by selecting a certain number or percentage of the rows (which is less than the total number or percentage of rows) to scan from the first table in the join order. During every execution of the loop that starts at block 820, the DBMS 150 scans a different portion of the rows from the first table in the join order.

Control then continues to block 825 where the DBMS 150 collects statistics related to the join operation, such as the number of rows that are eliminated or discarded from the result set 152 by the join operation (also called fan-in) for each table and the number of rows that are returned to the result set 152 by the join operation (also called fan-out). The DBMS 150 later uses these collected statistics to change the join order for the query 158. Consider the following example. One join operation may have a high fan-out rate in which each row of table A matches multiple rows in table B. If this join is performed first, then each of these matching rows need to be later joined to another table C, thereby requiring a number of intermediate operations. Conversely, the join operation may have a high fan-in rate, in which each row of table A matches few rows in table C. If this join operation is performed first, then only a few rows need be joined with table B, thereby saving a number of intermediate operations.

Control then continues to block 826 where the DBMS 150 determines whether the execution of the execution plan for the query has built temporary hash tables and indexes and populated them with data. If the determination at block 826 is true, then the execution of the query has built temporary hash tables and indexes and populated them with data, so control continues to block 827 where the DBMS 150 starts a timer for a wakeup threshold amount of time (previously calculated at block 817) if the timer has not yet already been started. Control then continues to block 828 where the DBMS 150 determines whether the timer has expired. That is, the DBMS 150 determines whether the amount of elapsed time since the timer was started is equal to or exceeds the wakeup threshold time period. If an embodiment, the timer raises an interrupt, in response to expiration of the timer, in lieu of the DBMS 150 explicitly checking to determine whether the timer has expired.

If the determination at block 828 is true, then the timer has expired, so control continues to block 830 where the DBMS 150 considers and evaluates execution plan changes and changes to the wakeup threshold time period, as further described below with reference to FIG. 10. Control then continues to block 835 where the DBMS 150 determines whether the execution of the execution plan for the query is complete. If the determination at block 835 is true, then execution of the execution plan for the query is complete, so control continues to block 840 where the DBMS 150 returns the result set 152 to the application 160 that sent the query or saves or displays the result set 152. Control then continues to block 845 where the DBMS 150 saves the execution time of the query, accumulated across all executions of the execution plan 225 to the execution plan 225. Control then returns to block 805 where the DBMS 150 receives the same or a different query from the same or a different application, as previously described above.

If the determination at block 835 is false, then the execution of the execution plan for the query is not complete, so control continues to block 850 where the DBMS 150 selects the next portion of the execution plan for the query to execute and sets the portion to execute to be the next selected portion of the execution plan for the query. Control then returns to block 820 where the DBMS 150 executes the next portion, as previously described above. If the determination at block 828 is false, then the timer has not expired, so control continues to block 835, as previously described above, without considering execution plan changes. If the determination at block 826 is false, then the execution of the portion of the query or the execution of a previous portion of the query has not built and populated temporary hash tables and indexes, so control continues to block 850, as previously described above, where the DBMS 150 selects the next portion of the execution plan of the query to execute without starting a timer and without considering execution plan changes. If the determination at block 810 is false, then an execution plan that implements the received query does not yet exist, so control continues to block 855 where the DBMS 150 estimates the number of returned rows by each join that is needed to implement the query. In an embodiment, the DBMS 150 estimates the number of returned rows based on the cardinality of the tables in the database or based on any other appropriate factors. Control then continues to block 855 where the DBMS 150 creates an execution plan that implements the query, for example, as previously described above with reference to FIGS. 4, 5, 6, and 7. In an embodiment, the DBMS 150 creates an execution plan by dividing the query into predicates, and creating join nodes and table nodes connected to the predicates. Control then continues to block 815, as previously described above.

Figure 9:
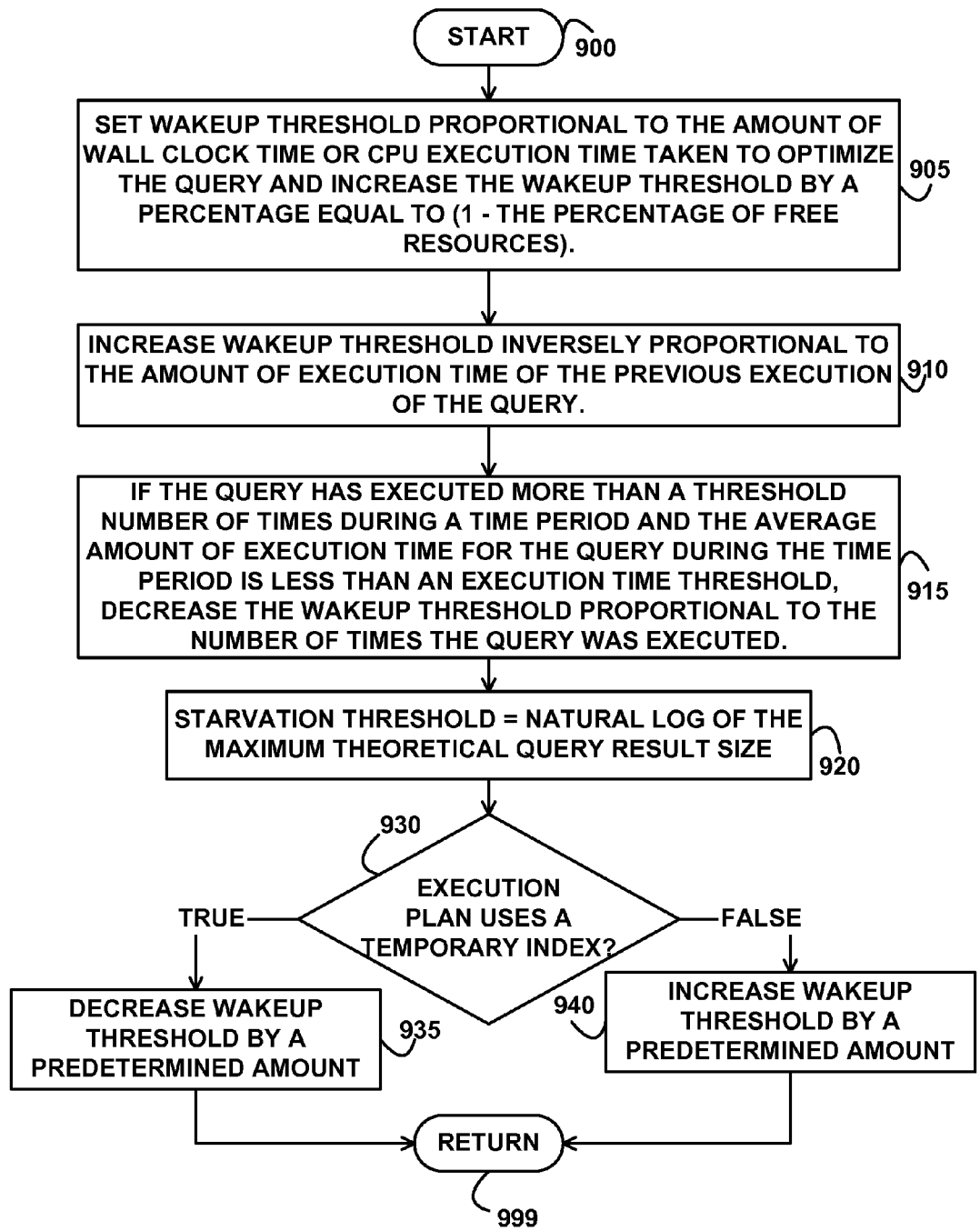
FIG. 9 depicts a flowchart of example processing for a wakeup threshold time period, according to an embodiment of the invention.

FIG. 9 depicts a flowchart of example processing for a wakeup threshold time period, according to an embodiment of the invention. Control begins at block 900. Control then continues to block 905 where the DBMS 150 sets the wakeup threshold time period proportional to the amount of elapsed wall clock time or CPU execution time that was used to optimize the query or create the execution plan (as previously described above with reference to block 860 of FIG. 8) and then increases the wakeup threshold time period by a percentage equal to (one minus the percentage of free, available, or unallocated resources—such as memory or processors—at the computer system 100).

Control then continues to block 910 where the DBMS 150 increases the wakeup threshold time period by an amount that is inversely proportional to the amount of execution time of a previous execution of a same or different execution plan that implements the same query. Control then continues to block 915 where the DBMS 150 decreases the wakeup threshold time period directly proportional to the number of times the same query was executed if the query has executed more than a threshold number of times during a time period and the average amount of execution time for the query during the time period is less than an execution time threshold. If the query has not executed more than a threshold number of times during a time period or the average amount of execution time for the query during the time period is greater than or equal to the threshold, then the DBMS 150 does not modify the wakeup threshold time period at block 915.

Control then continues to block 920 where the DBMS 150 sets the starvation threshold to be a multiple of the natural logarithm of the maximum theoretical query result size. In various embodiments, the DBMS 150 may receive the multiple from the application 160, from a user or database administrator via a user interface presented on the user I/O device 121, or the multiple may be set by a designer of the query optimizer 215. In various embodiments, the DBMS 150 estimates the maximum theoretical query result size to be a product of the number of rows in each table in the join or any other appropriate estimate. The natural logarithm is the logarithm to the base e, where e is an irrational constant approximately equal to 2.718281828. The natural logarithm of a number x (written as $\ln(x)$) is the power to which e would need to be raised to equal x. For example, $\ln(7.389)$ is 2, because $e^2=7.389$. Control then continues to block 930 where the DBMS 150 determines whether the executing of the execution plan uses a temporary index. If the determination at block 930 is true, then the execution plan uses a temporary index, so control continues to block 935 where the DBMS 150 decreases the wakeup threshold time period by a predetermined amount, which is selected by a user, the database administrator, or a designer of the DBMS 150. Control then continues to block 999 where the logic of FIG. 9 returns. If the determination at block 930 is false, then the execution plan does not use a temporary index, so control continues to block 940 where the DBMS 150 increases the wakeup threshold time period by a predetermined amount. Control then continues to block 999 where the logic of FIG. 9 returns. In an embodiment, a temporary index is one of the indexes 240 that the query optimizer 215 creates in response to the needs of a query that the query optimizer 215 has received. In an embodiment, the query optimizer 215 deletes the temporary index in response to the temporary index not being used by a query for more than a threshold period of time. In various embodiments, a temporary index is used by only one execution plan or by more than one execution plan. A temporary index is in contrast to a permanent index, which a user, a database administrator, or the application 160 creates in response to the anticipated needs of future queries, which have not yet been received by the query optimizer 215. A permanent index persists until it is deleted by the user, by the application 160, or by a database administrator.

Figure 10:
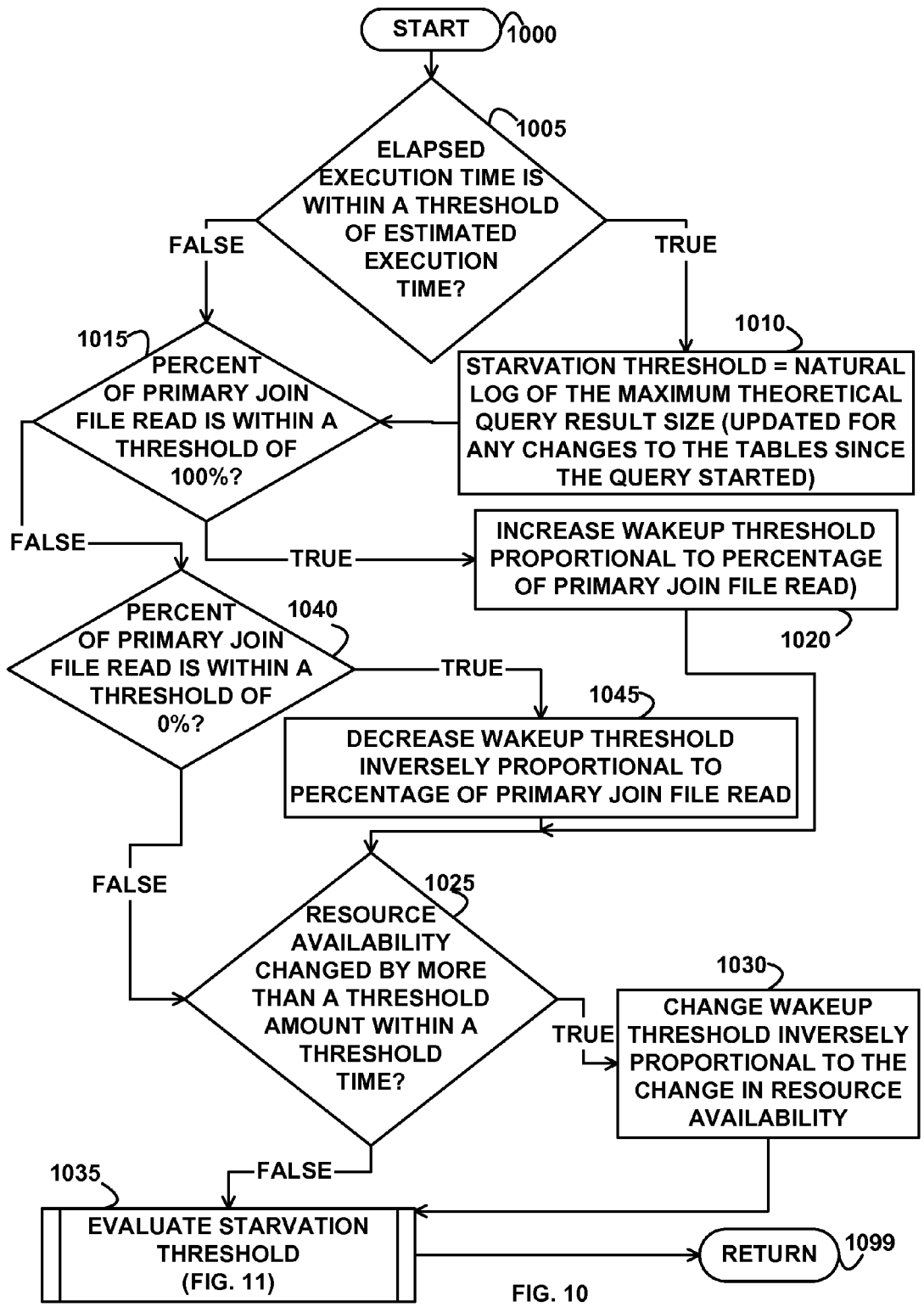
FIG. 10 depicts a flowchart of example processing for considering execution plan changes, according to an embodiment of the invention.

FIG. 10 depicts a flowchart of example processing for considering execution plan changes, according to an embodiment of the invention. Control begins at block 1000. Control then continues to block 1005 where the DBMS 150 determines whether the elapsed execution time of the query since the query started is within a threshold (is less than a threshold) of an estimated execution time of the query. If the determination at block 1005 is true, then the elapsed execution time of the query is within a threshold of an estimated execution time, so control continues to block 1010 where the DBMS 150 sets the starvation threshold to be the natural logarithm of the maximum theoretical query result size. The DBMS 150 updates the maximum theoretical query result size for any changes (insertions, updates, or deletions of rows) that the DBMS 150 has made to the tables since the time that execution of the query started, as the applications 160 may request changes to the tables concurrently with execution of the query.

Control then continues to block 1015 where the DBMS 150 determines whether the percentage of primary join file read that is complete is within a first primary join threshold of 100%. The primary join file read refers to the number of read operations that the DBMS 150 performs on the first (left-most or primary) table node in the join order of the execution plan. If the determination at block 1015 is true, then the percentage of the number primary join file reads (as a percentage of the total estimated number of join file reads required) that are complete is within a first primary join threshold of 100%, so control continues to block 1020 where the DBMS 150 increases the wakeup threshold time period in proportion to the percentage of the primary join file reads that are complete. Control then continues to block 1025 where the DBMS 150 determines whether the resource availability has changed by a threshold amount within a threshold amount of time (in less than a threshold amount of time) since the execution of the execution plan for query began. In various embodiments, the resource availability is the amount or percentage of free or available resources in the computer system 100. Resources may include, but are not limited to memory, processor utilization, and network bandwidth. In an embodiment, resource availability may change by either increasing or decreasing.

If the determination at block 1025 is true, then the resource availability has changed by a more than a threshold amount within a threshold amount of time since the query started executing, so control continues to block 1030 where the DBMS 150 changes the wakeup threshold time period in inverse proportion to the change in the resource availability. Thus, if resource availability increased, then the wakeup threshold time period decreases; if resource availability decreased, then the wakeup threshold time period increases.

If resource availability has decreased, then the resources at the current time are less than at the time when the query was optimized and execution began. For example, if at the time when the query was optimized, the computer system 100 only had one user, then in an embodiment, the DBMS 150 optimized the execution plan to utilize all of the available resources of the machine. Later, if fifty users use the computer system, and the query execution is interfering with the resources needed by other users, the operation of the logic of block 1030 causes re-optimization of the query and, in an embodiment, the DBMS 150 chooses a more conservative execution plan that does not use all the resources of the computer system 100. Control then continues to block 1035 where the DBMS 150 evaluates the starvation threshold, as further described below with reference to FIG. 11. Control then continues to block 1099 where the logic of FIG. 10 returns.

If the determination at block 1025 is false, then the resource availability has not changed by more than a threshold amount within a threshold amount of time since the query started executing, so control continues to block 1035 where the DBMS 150 evaluates the starvation threshold without changing the wakeup threshold time period at block 1030, as further described below with reference to FIG. 11. Control then continues to block 1099 where the logic of FIG. 10 returns. If the determination at block 1015 is false, then the percentage of primary join file read that is complete is not within a first primary join threshold of 100%, so control continues to block 1040 where the DBMS 150 determines whether the percentage of the primary join file read that is complete is within (is less than) a second primary join threshold percentage of 0%. If the determination at block 1040 is true, then the percentage of the primary join file read that is complete is within a second primary join threshold percentage of 0%, so control continues to block 1045 where the DBMS 150 decreases the wakeup threshold time period in inverse proportional to the percentage of the primary join file read that is complete. Control then continues to block 1025, as previously described above.

If the determination at block 1040 is false, then the percentage of the primary join file read that is complete is not within a second primary join threshold percentage of 0%, so control continues to block 1025 without decreasing the wakeup threshold time period at block 1045, as previously described above. If the determination at block 1005 is false, then the elapsed execution time of the query is not within a threshold of an estimated execution time of the query, so control continues to block 1015, as previously described above, without modifying the starvation threshold at block 1010.

Figure 11:
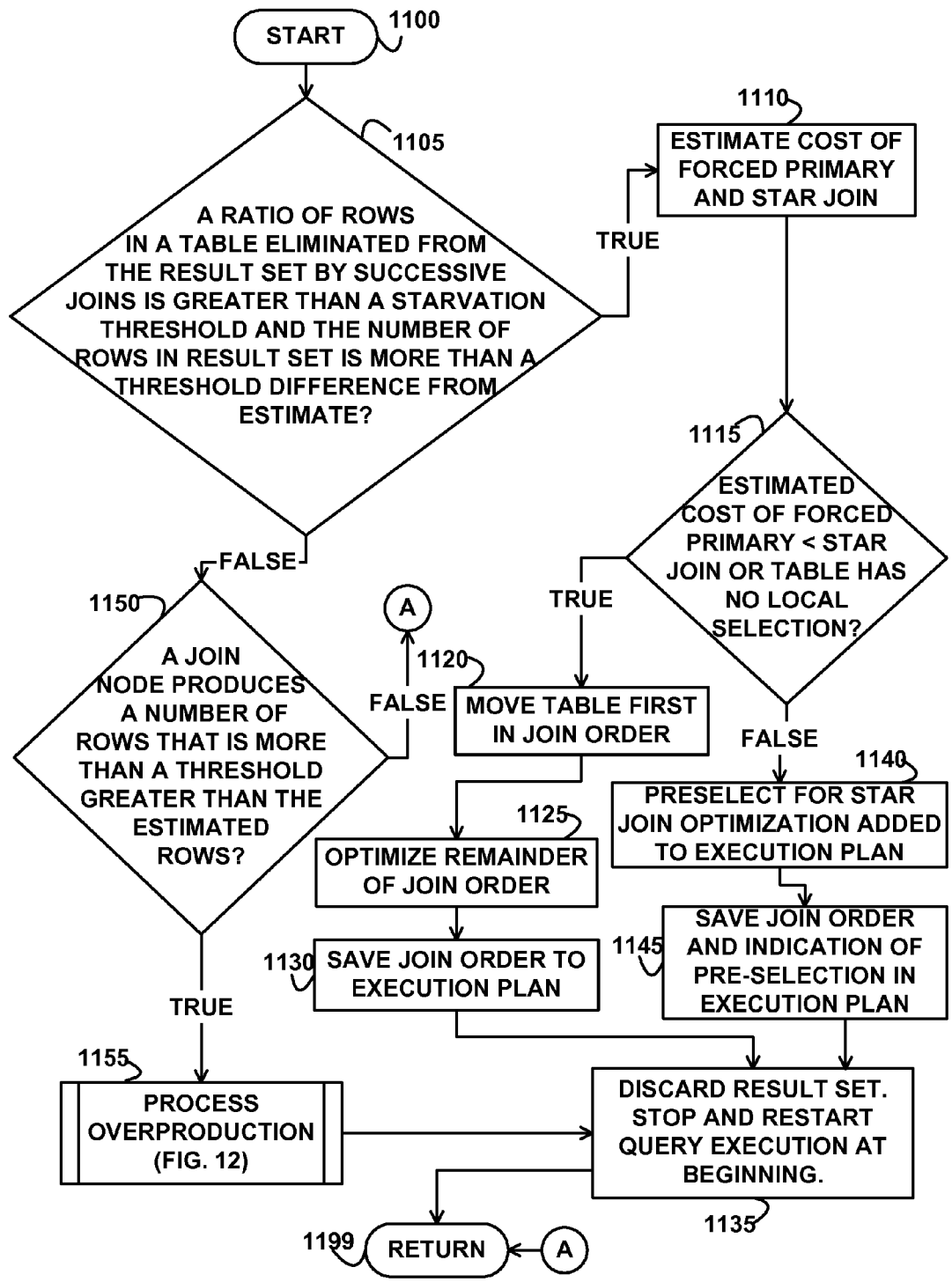
FIG. 11 depicts a flowchart of example processing for evaluating a starvation threshold, according to an embodiment of the invention.

FIG. 11 depicts a flowchart of example processing for evaluating a starvation threshold, according to an embodiment of the invention. Control begins at block 1100. Control then continues to block 1105 where the DBMS 150 determines whether a ratio of rows from a table eliminated from the result set 152 by successive joins (successive in the join order with no intervening join) is greater than a starvation threshold and the number of rows in the result set 152 is more than a threshold difference from an estimate of the number of rows in the result set 152.

Prior to performing a join operation, the DBMS 150 estimates the number of rows that will remain in the result set 152 after the join operation is performed. A join operation eliminates rows by removing or deleting rows from the result set 152 that do not satisfy the predicate that is connected to the join node that represents the join operation. If the ratio is greater than the starvation threshold, the DBMS has identified a starvation join condition, where a join of rows from a table (a second table that is later or more right-most than a first table in the successive joins of block 1105) later in the join order eliminates a large number of rows from the result set. In an embodiment, a query performs better if a table node that eliminates a large number, or the largest number as compared to all other table nodes, of rows is first in the join order.

Using the example of FIG. 6, if the rows 1 through 9 in the returned row identifier set 660 represent rows returned by a portion of the query (executed by the loop that starts at block 820 of FIG. 8) and the result set 152-1 represents a partial result set created by the portion of the query, then the join (represented by the join node 605) of the table t1 (represented by the table node 615, which is not first in the join order) eliminated two rows from the partial result set 152-1 because the partial result set 152-1 includes seven rows while the returned result identifier set 660 identifies nine rows (9−7=2). Thus, if the number of rows eliminated (2) is more than a threshold number of rows and the number of rows in the partial result set (seven rows) is more than a threshold difference from an estimated number of rows in the partial result set, then the determination of block 1105 is true.

If the determination at block 1105 is true, then a ratio of rows of a table eliminated from the result set 152 by successive joins is greater than a starvation threshold and the number of rows in the result set 152 is more than a threshold difference from an estimate of the number of rows in the result set 152, so control continues to block 1110 where the DBMS 150 estimates the costs of performing the query 158 using a prospective execution plan that comprises a forced primary join and using a prospective execution plan that comprises a star join with pre-selection. The forced primary join was previously described above with reference to FIG. 5. The star join with pre-selection was previously described above with reference to FIG. 7. In various embodiments, the DBMS 150 estimates the estimated costs for each execution plan to be the estimated number of scans of the tables, the estimated number of probes of the tables, the estimated amount of memory used by each prospective execution plan, the estimated amount of time needed to perform each prospective execution plan, the estimated number of rows that added to the result set 152 (or any temporary or intermediate result set) by join operations, but then are deleted from the result set 152 by a subsequent join operation during execution of each prospective execution plan, or any combination thereof.

Control then continues to block 1115 where the DBMS 150 determines whether the estimated cost of performing the query 158 using a prospective execution plan that comprises a forced primary join is less than the estimated cost of performing the query 158 using a prospective execution plan that comprises a star join with pre-selection or the table (selected at block 1105) has no local selection.

If the determination at block 1115 is true, then the estimated cost of performing the query 158 using a prospective execution plan that comprises a forced primary join is less than the estimated cost of performing the query 158 using a prospective execution plan that comprises a star join with pre-selection or the table (selected at block 1105) has no local selection, so control continues to block 1120 where the DBMS 150 moves the table that was found by the determination of block 1105 to be first in the join order in the execution plan 225. That, is the DBMS 150 modifies the previous execution plan into a new execution plan that implements a forced primary join.

Control then continues to block 1125 where the DBMS 150 optimizes the remainder of the join order (other than the table that is now first in the join order) using a join order optimization technique. An example of a join order optimization technique is to estimate the number of rows returned for each table and then order the tables in the join by increasing estimated number of rows returned, with the table that has the lowest estimated number of rows being first and the table with the largest estimated number of rows being last in the join order. An example way to estimate the number of rows returned is to calculate the cardinality of the table, i.e., the number of rows in the table. But, in other embodiments, any appropriate join order optimization technique may be used.

Control then continues to block 1130 where the DBMS 150 saves the new join order to the new execution plan. Control then continues to block 1135 where the DBMS 150 discards the result set 152, stops the query execution, and restarts the query execution from the beginning, meaning that the loop that starts at block 820 in FIG. 8 once again begins executing a portion of the query in the new join order via the new execution plan, starting by scanning a first portion of the rows in the new first table in the new join order. Since the new join order in the new execution plan is different, in an embodiment, the partial result set created by the re-execution is also different from the partial result set previously created. Control then continues to block 1199 where the logic of FIG. 11 returns.

If the determination at block 1115 is false, then the estimated cost of performing the query 158 using a prospective execution plan that comprises a forced primary join is not less than the estimated cost of performing the query 158 using a prospective execution plan that comprises a star join with pre-selection and the table (selected at block 1105) has local selection, so control continues to block 1140 where the DBMS 150 modifies the current execution plan into a new execution plan that implements star join optimization with pre-selection, as previously described above with reference to FIG. 7.

The DBMS 150 creates the new execution plan with star join optimization and pre-selection by selecting the table that was previously found at block 1105, designating that table as a dimension table in the star join, with its connected predicates set to the local selection predicates specified by the query and by modifying the subsequent probes of that table to access that table using the temporary result set created by the pre-selection, as previously described above with reference to FIG. 7.

Control then continues to block 1145 where the DBMS 150 saves the join order and an indication of a star join with pre-selection into the new execution plan. Control then continues to block 1135 where the DBMS 150 discards the partial result set, stops the query execution, and restarts the query execution from the beginning, using the new execution plan. Control then continues to block 1199 where the logic of FIG. 11 returns.

If the determination at block 1105 is false, then a ratio of rows of a table eliminated from the result set 152 by successive joins is not greater than a starvation threshold or the number of rows in the result set 152 is not more than a threshold difference from an estimate of the number of rows in the result set 152, so control continues to block 1150 where the DBMS 150 determines whether execution of a join operation represented by a join node in the tree produces a number of rows (adds a number of rows to the result set) that is more than an overproduction threshold value greater than the estimated number of rows produced by the join node.

If the determination at block 1150 is true, then the DBMS 150 found a join node that produces a number of rows that is more than an overproduction threshold value greater than the estimated number of rows produced by the join node, so control continues to block 1155 where the DBMS 150 processes the overproduction of rows returned by the join node, as further described below with reference to FIG. 12.

Control then continues to block 1135 where the DBMS 150 discards the result set 152, stops the query execution, and restarts the query execution from the beginning. Control then continues to block 1199 where the logic of FIG. 11 returns. If the determination at block 1150 is false, then the DBMS 150 did not find a join node that produces a number of rows that is more than an overproduction threshold value greater than the estimated number of rows produced by the join node, so control continues to block 1199 where the logic of FIG. 11 returns. The query execution is thus not stopped and the result set 152 is not discarded, so that the execution of the query continues to the next step of the join, keeping the partial result set that has been thus far produced.

Figure 12:
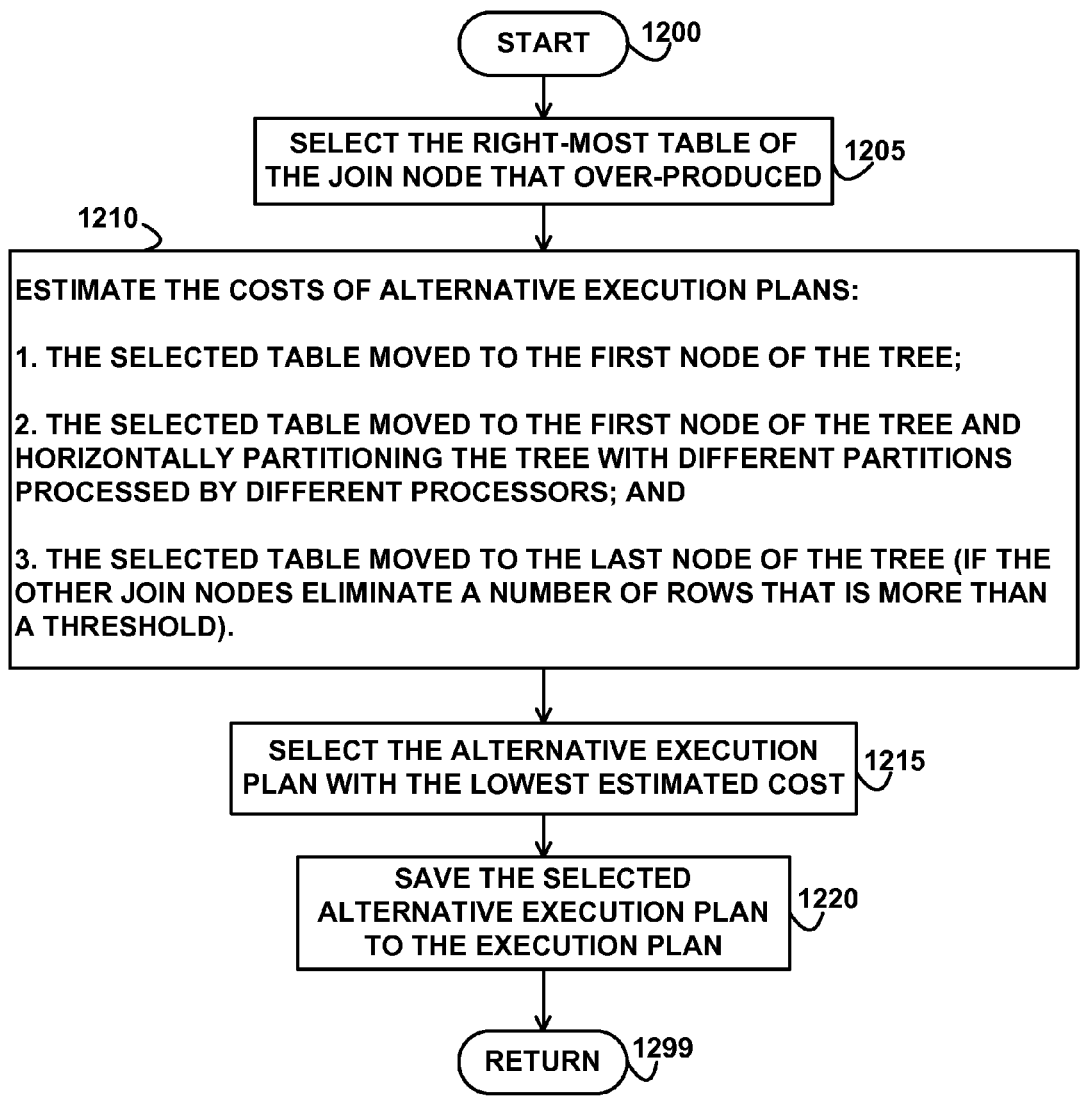
FIG. 12 depicts a flowchart of example processing for over production, according to an embodiment of the invention.

FIG. 12 depicts a flowchart of example processing for over production, according to an embodiment of the invention. Control begins at block 1200. Control then continues to block 1205 where the DBMS 150 selects the right-most (last in the join order) child table of the join node that was determined to have over-produced rows by the processing of block 1150.

Control then continues to block 1210 where the DBMS 150 estimates the costs of the following alternative execution plans:
1. An execution plan with the selected table moved to the first node (in the join order) of the tree;
2. An execution plan with the selected table moved to the first node (in the join order) of the tree and the selected table is horizontally partitioned with the join of different rows in different partitions being processed by different processors; and
3. An execution plan with the selected table moved to the last node (in the join order) of the tree (if the other join nodes eliminate a number of rows from the result set 152 that is more than a threshold).

In various embodiments, the cost of an execution plan 225 comprises the processing time and/or the amount of memory needed to execute the query 158 using the execution plan 225.

Control then continues to block 1215 where the DBMS 150 selects the alternative execution plan that has the lowest estimated cost. Control then continues to block 1220 where the DBMS 150 saves the selected alternative execution plan to the execution plan. Control then continues to block 1299 where the logic of FIG. 12 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:
1. A method comprising:
creating an execution plan for a query;
calculating a first wakeup threshold time period, wherein the calculating the first wakeup threshold time period further comprises setting the first wakeup threshold time period proportional to an amount of time taken by the creating the execution plan;

executing a portion of the execution plan for the query to produce a portion of rows in a result set until the first wakeup threshold time period expires; and after the first wakeup threshold time period expires, evaluating changes to the execution plan, wherein the evaluating further comprises if a ratio of rows eliminated from the result set by successive joins of a first table and a second table is greater than a starvation threshold and a number of the portion of rows in the result set is more than a threshold difference from an estimated number of rows, determining whether an estimated cost of a forced primary join is less than an estimated cost of a star join, and if the estimated cost of the forced primary join is less than the estimated cost of the star join, moving the second table first in a join order in the execution plan, discarding the portion of rows in the result set, and re-starting the executing to produce a different portion of the rows.

2. The method of claim 1, wherein the calculating the first wakeup threshold time period further comprises:

increasing the first wakeup threshold time period by a percentage equal to one minus a percentage of free resources at a computer system; and increasing the first wakeup threshold time period inversely proportional to an amount of execution time of a previous execution of the execution plan.

3. The method of claim 2, wherein the calculating the first wakeup threshold time period further comprises:

decreasing the first wakeup threshold time period proportional to a number of times the execution plan was executed in response to the execution plan executing more than a threshold number of times during a time period and an average execution time for the execution plan during the time period being less than an execution time threshold.

4. The method of claim 3, wherein the calculating the first wakeup threshold time period further comprises:

decreasing the first wakeup threshold time period if the executing the portion of the execution plan for the query uses a temporary index; and increasing the first wakeup threshold time period if the executing the portion of the execution plan for the query does not use a temporary index.

5. The method of claim 1, further comprising:

after the first wakeup threshold time period expires, increasing the first wakeup threshold time period proportional to a percentage of a primary join file read, to create a second wakeup threshold time period in response to a percentage of the primary join file read being within a first primary join threshold of one hundred percent; and executing another portion of the execution plan for the query to produce another portion of rows in the result set until the second wakeup threshold time period expires.

6. The method of claim 1, further comprising:

after the first wakeup threshold time period expires, decreasing the first wakeup threshold time period proportional to a percentage of a primary join file read, to create a second wakeup threshold time period in response to a percentage of the primary join file read being within a second primary join threshold of zero percent; and executing another portion of the execution plan for the query to produce another portion of rows in the result set until the second wakeup threshold time period expires.

7. The method of claim 1, further comprising:

after the first wakeup threshold time period expires, changing the first wakeup threshold time period inversely proportional to a change in a percentage of free resources at a computer system, to create a second wakeup threshold time period in response to the percentage of free resources being changed by more than a threshold amount; and executing another portion of the execution plan for the query to produce another portion of rows in the result set until the second wakeup threshold time period expires.

8. The method of claim 1, further comprising:

setting the starvation threshold to be a multiple of a natural logarithm of a maximum query result size.

9. A non-transitory computer-readable storage medium encoded with instructions, wherein the instructions when executed comprise:

creating an execution plan for a query;

calculating a first wakeup threshold time period, wherein the calculating the first wakeup threshold time period further comprises setting the first wakeup threshold time period proportional to an amount of time taken by the creating the execution plan;

executing a portion of the execution plan for the query to produce a portion of rows in a result set until the first wakeup threshold time period expires; and after the first wakeup threshold time period expires, evaluating changes to the execution plan, wherein the evaluating further comprises if a ratio of rows eliminated from the result set by successive joins of a first table and a second table is greater than a starvation threshold and a number of the portion of rows in the result set is more than a threshold difference from an estimated number of rows, determining whether an estimated cost of a forced primary join is less than an estimated cost of a star join, and if the estimated cost of the forced primary join is less than the estimated cost of the star join, moving the second table first in a join order in the execution plan, discarding the portion of rows in the result set, and re-starting the executing to produce a different portion of the rows.

10. non-transitory The computer-readable storage medium of claim 9, wherein the calculating the first wakeup threshold time period further comprises:

increasing the first wakeup threshold time period by a percentage equal to one minus a percentage of free resources at a computer system; and increasing the first wakeup threshold time period inversely proportional to an amount of execution time of a previous execution of the execution plan.

11. The non-transitory computer-readable storage medium of claim 10, wherein the calculating the first wakeup threshold time period further comprises:

decreasing the first wakeup threshold time period proportional to a number of times the execution plan was executed in response to the execution plan being executed more than a threshold number of times during a time period and an average execution time for the execution plan during the time period being less than an execution time threshold;

decreasing the first wakeup threshold time period if the executing the portion of the execution plan for the query uses a temporary index; and increasing the first wakeup threshold time period if the executing the portion of the execution plan for the query does not use a temporary index.

12. The non-transitory computer-readable storage medium of claim 9, further comprising:
- after the first wakeup threshold time period expires, increasing the first wakeup threshold time period proportional to a percentage of a primary join file read, to create a second wakeup threshold time period in response to a percentage of the primary join file read being within a first primary join threshold of one hundred percent;
- after the first wakeup threshold time period expires, decreasing the first wakeup threshold time period proportional to a percentage of a primary join file read, to create the second wakeup threshold time period in response to a percentage of the primary join file read being within a second primary join threshold of zero percent;
- after the first wakeup threshold time period expires, changing the first wakeup threshold time period inversely proportional to a change in a percentage of free resources at a computer system, to create the second wakeup threshold time period in response to the percentage of free resources being changed by more than a threshold amount; and
- executing another portion of the execution plan for the query to produce another portion of rows in the result set until the second wakeup threshold time period expires.

13. The non-transitory computer-readable storage medium of claim 9, further comprising:
- setting the starvation threshold to be a multiple of a natural logarithm of a maximum query result size.

14. A computer system, comprising:
- a processor; and
- memory communicatively coupled to the processor, wherein the memory is encoded with instructions, wherein the instructions when executed on the processor comprise:
  - creating an execution plan for a query,
  - calculating a first wakeup threshold time period, wherein the calculating the first wakeup threshold time period further comprises setting the first wakeup threshold time period proportional to an amount of time taken by the creating the execution plan,
  - executing a portion of the execution plan for the query to produce a portion of rows in a result set until the first wakeup threshold time period expires, and
  - after the first wakeup threshold time period expires, evaluating changes to the execution plan, wherein the evaluating further comprises if a ratio of rows eliminated from the result set by successive joins of a first table and a second table is greater than a starvation threshold and a number of the portion of rows in the result set is more than a threshold difference from an estimated number of rows, determining whether an estimated cost of a forced primary join is less than an estimated cost of a star join, and if the estimated cost of the forced primary join is less than the estimated cost of the star join, moving the second table first in a join order in the execution plan, discarding the portion of rows in the result set, and re-starting the executing to produce a different portion of the rows.

15. The computer system of claim 14, wherein the calculating the first wakeup threshold time period further comprises:
- increasing the first wakeup threshold time period by a percentage equal to one minus a percentage of free resources at the computer system; and
- increasing the first wakeup threshold time period inversely proportional to an amount of execution time of a previous execution of the execution plan.

16. The computer system of claim 15, wherein the calculating the first wakeup threshold time period further comprises:
- decreasing the first wakeup threshold time period proportional to a number of times the execution plan was executed in response to the execution plan being executed more than a threshold number of times during a time period and an average execution time for the execution plan during the time period being less than an execution time threshold;
- decreasing the first wakeup threshold time period if the executing the portion of the execution plan for the query uses a temporary index; and
- increasing the first wakeup threshold time period if the executing the portion of the execution plan for the query does not use a temporary index.

17. The computer system of claim 14, wherein the instructions further comprise:
- after the first wakeup threshold time period expires, increasing the first wakeup threshold time period proportional to a percentage of a primary join file read, to create a second wakeup threshold time period in response to a percentage of the primary join file read being within a first primary join threshold of one hundred percent;
- after the first wakeup threshold time period expires, decreasing the first wakeup threshold time period proportional to a percentage of a primary join file read, to create the second wakeup threshold time period in response to a percentage of the primary join file read being within a second primary join threshold of zero percent; and
- after the first wakeup threshold time period expires, changing the first wakeup threshold time period inversely proportional to a change in a percentage of free resources at the computer system, to create the second wakeup threshold time period in response to the percentage of free resources being changed by more than a threshold amount.

18. The computer system of claim 17, wherein the instructions further comprise:
- executing another portion of the execution plan for the query to produce another portion of rows in the result set until the second wakeup threshold time period expires.

19. The computer system of claim 14, wherein the instructions further comprise:
- setting the starvation threshold to be a multiple of a natural logarithm of a maximum query result size.

* * * * *